June 6, 1933.  H. L. BRUMP  1,912,757

TUNING MECHANISM

Filed March 2, 1932  2 Sheets-Sheet 1

Inventor
HERBERT L. BRUMP
By Spencer Hardman & Fehr
his Attorneys

June 6, 1933.  H. L. BRUMP  1,912,757
TUNING MECHANISM
Filed March 2, 1932    2 Sheets-Sheet 2

Inventor
HERBERT L. BRUMP
By Spencer Hardman & Fehr
his Attorneys

Patented June 6, 1933

1,912,757

UNITED STATES PATENT OFFICE

HERBERT L. BRUMP, OF DAYTON, OHIO, ASSIGNOR TO GENERAL MOTORS RADIO CORPORATION, OF DAYTON, OHIO, A CORPORATION OF OHIO

TUNING MECHANISM

Application filed March 2, 1932. Serial No. 596,396.

This invention relates to mechanism for tuning radio circuits such as may be used in radio receiving sets.

Such radio circuits are ordinarily tuned by means of a variable condenser having a series of movable plates mounted upon a rotatable shaft which is rotated to vary the capacity of the condenser by moving the series of movable plates into lapped position with the stationary plates of the condenser or out of lapped position therewith.

Such condensers may be designed so that the capacity thereof varies directly proportional with the angle through which the shaft is rotated, and such condensers are called straight line capacity or "S. L. C." condensers. Or such condensers may be designed so that, if the inductance of the circuit is constant, the resonant frequency of the circuit varies directly with the angle through which the shaft is rotated, and such condensers are called straight line frequency or "S. L. F." condensers. Now when an indicating dial calibrated in kilo-cycles is turned through equal angles with equal angles of a S. L. F. condenser the divisions will be equally spaced, but this is not true for a S. L. C. condenser or for a condenser having a tuning curve intermediate that of S. L. C. and S. L. F.

Now the object of this invention is to provide a simple manual drive for a radio condenser other than a S. L. F. condenser and means whereby the indicator dial calibrated in kilo-cycles may have equal divisions and correctly indicate the resonant frequency of the circuit throughout the dial scale.

This feature is accomplished by gearing the dial to the condenser shaft in such manner that the dial movement is slow relative to the condenser plate movement when the capacity of the condenser is large, that is, at the beginning of the unlapping movement of the condenser plates, and that the dial movement is fast relative to the condenser plate movement at the other end of the dial scale, that is, at the end of the unlapping movement of the condenser plates.

An object of the invention therefore is to provide a simple yet accurate gearing mechanism between the indicator dial and the rotating shaft of the condenser which accomplishes the desired result of equal dial divisions marking the frequency of the circuit.

A special object of this invention is to provide such a gearing mechanism having a compact structure so that it may be conveniently used in compact radio receiving sets where space is limited. Note that no part of the gearing mechanism extends laterally beyond the periphery of the driving drum to which the indicating dial is attached. The cam used to give the desired exact relative movement between the condenser shaft and the indicating dial therefor is simple in shape, which is an important advantage from a manufacturing viewpoint.

Further objects and advantages of the present invention will be apparent from the following description, reference being had to the accompanying drawings wherein a preferred embodiment of one form of the present invention is clearly shown.

In the drawings:—

Similar reference characters refer to similar parts throughout the several views.

Numeral 10 designates the stationary frame of a gang condenser such as is in common use in present day radio receiving sets. The rotating condenser shaft 11 projects from frame 10, and when shaft 11 is rotated through an angle of about 180 degrees the capacity of the condenser is varied from a maximum (when the condenser plates are fully lapped) to a minimum (when the plates are fully unlapped). The plate structure of such condensers is so well known its illustration has been omitted from the drawings for the sake of clearness of illustration of the drive mechanism for the condenser shaft.

Figures 1, 2:
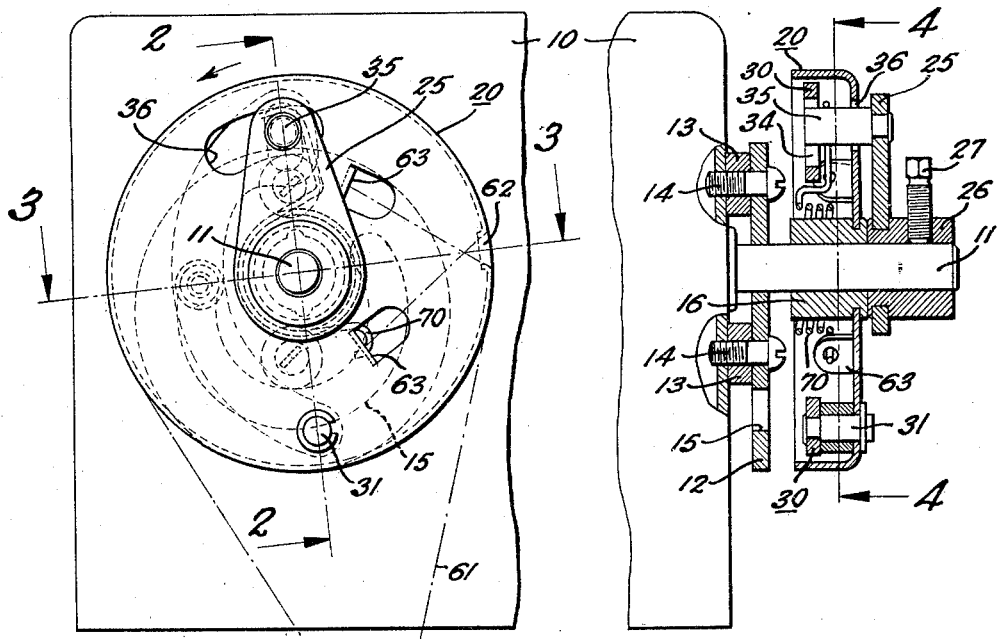
Fig. 1 is an end view of a condenser drive mechanism made according to this invention. The parts are shown as seen from the right of Fig. 2.
Fig. 2 is a section on the line 2—2 of Fig. 1.
Figure 3:
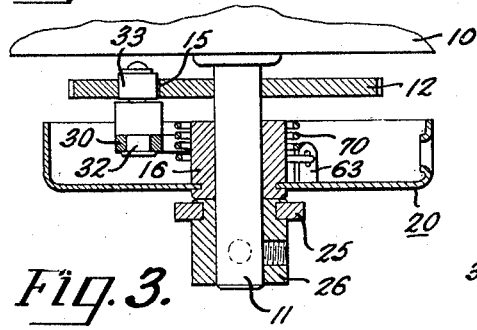
Fig. 3 is a section on the line 3—3 of Fig. 1.

A stationary cam plate 12 having a substantially circular cam slot 15 therein is rigidly fixed to the frame 10 by the two spacers 13 and screws 14 (see Fig. 2). The driving drum 20 has fixed thereto a hub 16 which is rotatably mounted on shaft 11 to permit relative rotation of drum 20 and shaft 11. Shaft 11 is driven by a crank 25 having a hub 26 fixed thereto which is fixed to shaft 11 by set screw 27.

Figure 4:
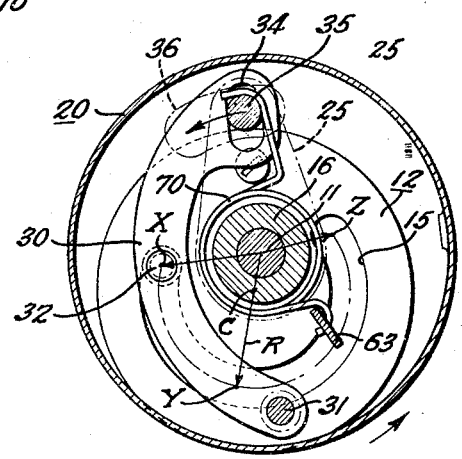
Fig. 4 is a section on the line 4—4 of Fig. 2 and shows the moving parts of the mechanism in their positions at the beginning of the unlapping movement of the movable condenser plates fixed to the condenser shaft.
Figure 7:
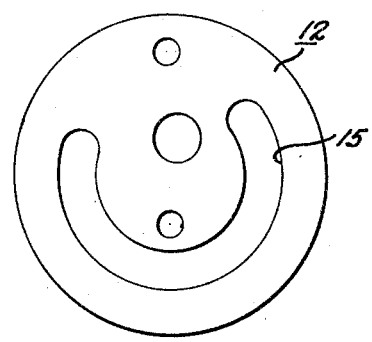
Fig. 7 is a detail view of the stationary cam plate.
Figure 5:
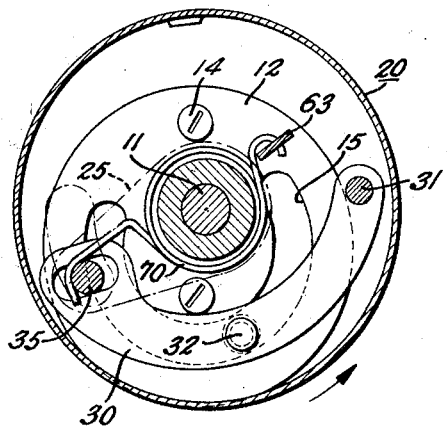
Fig. 5 is similar to Fig. 4 but shows the parts in position after the condenser shaft has been rotated counter-clockwise about 110 degrees.
Figure 6:
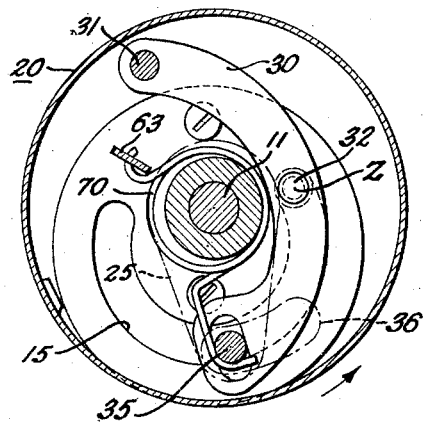
Fig. 6 is similar to Fig. 4 but shows the parts in position after the condenser shaft has been rotated counter-clockwise about 180 degrees from that shown in Fig. 4.
Figure 8:
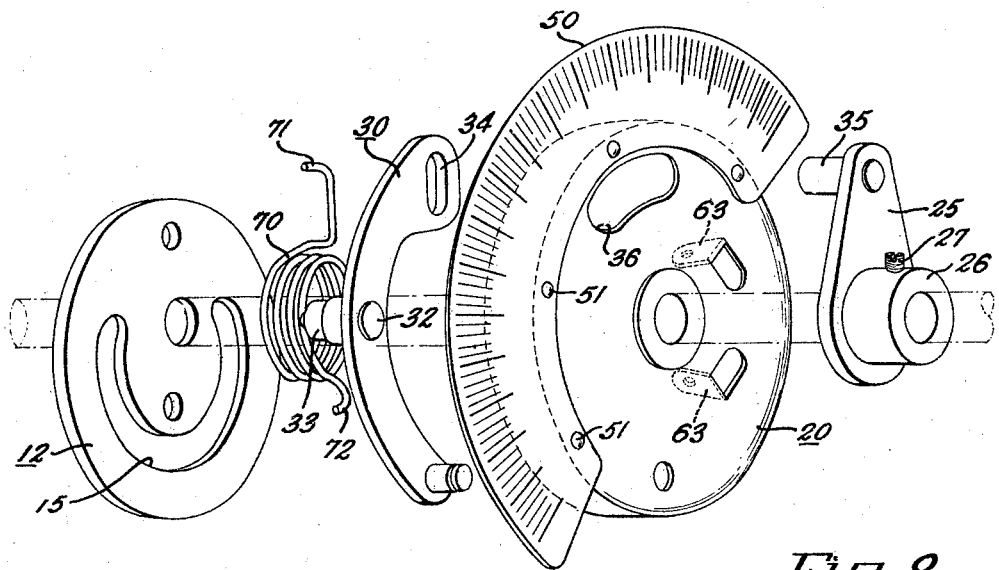
Fig. 8 is an exploded view of the mechanism parts aligned for assembly on the condenser shaft.

Now the crank 25 is driven by drum 20 in such manner that the angular speed of drum 20 continuously increases relative to the angular speed of condenser shaft 11 from the position shown in Fig. 4 to the position shown in Fig. 6, that is, during a rotation through 180 degrees of condenser shaft 11 from its maximum capacity setting to its minimum capacity setting. This is the fundamental desired result aimed at in this invention. The mechanism for accomplishing this result will now be described. A curved lever 30 is pivotally mounted upon drum 20 by the pivot pin 31 so that it may swing in a small arc about its pivot 31. Lever 30 has a cam follower pin 32 fixed thereto which projects within the cam slot 15 in stationary cam 12 which thus determines the swinging movement of lever 30 as drum 20 is rotated counter-clockwise as seen in Figs. 1, 4, 5, and 6. For the purpose of reducing friction cam pin 32 preferably has a roller 33 thereon to provide rolling instead of sliding friction on cam slot 15. Lever 30 also has a short slot 34 in its outer end which engages a pin 35 rigidly fixed to the crank 25 on shaft 11 (see Fig. 2). Pin 35 projects through a clearance opening 36 in drum 20 in order to provide for the desired relative rotation between drum 20 and crank 25.

Now it will be clear from viewing Fig. 4 that when drum 20 is rotated counter-clockwise as shown by the arrow, the lever 30 will first be swung radially outward due to the cam follower pin 32 following the stationary cam slot 15 from the position X to the position Y since the distance R of said cam slot 15 from the center of shaft 11 continuously increases between points X and Y; and from position Y to position Z this distance R continuously decreases and hence when cam pin 32 passes from point Y to point Z the lever 30 will be swung radially inward. This swinging movement of lever 30 causes crank 25 to run ahead of or faster than the drum 20 as pin 32 moves from point X to point Y and to run behind or slower than drum 20 as pin 32 moves from point Y to point Z. Hence when starting from position shown in Fig. 4 the angular speed of the condenser shaft 11 will be greater than that of drum 20 but this difference in angular speeds will continuously decrease until pin 32 reaches point Y when the angular speeds will be the same; as pin 32 moves from point Y to point Z the angular speed of drum 20 will be greater than that of shaft 11 with an increasing difference. In other words, the drum 20 starts slower than the shaft 11 (when pin 32 is at X), catches up to an equal angular speed therewith (when pin 32 is at Y), and ends up at a much faster angular speed (when pin 32 is at Z). Moreover the gain in angular speed of drum 20 on shaft 11 is continuous from point X to point Z since the distance R continuously increases from point X to point Y and continuously decreases from point Y to point Z. This gain though continuous, the rate of gain need not be constant but may be varied as desired by the design of the cam slot 15. It will be noted that in the form illustrated the cam slot 15 is circular in form and the desired variation in the above-mentioned rate of gain obtained by the proper location of the center C of slot 15 relative to the center of shaft 11 (see Fig. 4). By thus making the cam slot 15 circular in form its manufacture is greatly simplified and its cost lessened. In Fig. 5 the parts have been rotated counter-clockwise from their position shown in Fig. 4, the shaft 11 having advanced about 110 degrees as indicated by the position of crank 25 while the drum 20 has advanced only about 90 degrees as indicated by the position of pin 31. In Fig. 6 the shaft 11 has advanced about 180 degrees while the drum 20 has advanced slightly more than 180 degrees. In Figs. 4, 5 and 6 the positions of the crank 25 and clearance slot 36 in drum 20 are shown in dot-and-dash lines to more clearly illustrate the relative motions of drum 20 and shaft 11 as the parts are rotated.

An indicating dial 50 is fixed to the drum 20 by suitable means such as the small rivets 51 and passes over a suitable stationary pointer. Hence the movement of dial 50 relative to the condenser shaft 11 is the same as that above described for drum 20. The ultimate purpose of this gearing mechanism of course is to permit the divisions on dial 50 marking the kilo-cycles to be equally spaced when the condenser turned by shaft 11 is other than a S. L. F. condenser. Condensers now found most practical for use in radio receiving sets are not S. L. F. condensers but are such that if the indicator dial is turned equal angles for equal angles of the condenser the dial divisions marking kilo-cycles must be more closely spaced at one end of the dial than the other. The gearing mechanism of this invention drives the dial increasingly faster relative to the condenser shaft as said condenser is varied from its maximum capacity to its minimum capacity and hence overcomes the necessity of closer spacing of the kilo-cycle divisions at one end of the dial. By proper design of the cam slot 15, as above described, the dial divisions may be made equally spaced and yet correctly indicate the resonant frequency of the condenser circuit.

The drum 20 may be driven by any suitable slow-motion means, such as by the manually turned pulley 60 and belt 61 indicated diagrammatically in Fig. 1. Belt 61 preferably passes through a hole 62 in the drum periphery and the two ends thereof are fixed to the lugs 63 on the drum 20. This permits the drum 20 to be rotated through an angle of 180 degrees by pulley 60.

A coil spring 70 is preferably used with this device to take up lost motion between the moving parts. Spring 70 has one hooked end 71 engaging pin 35 of crank 25 and its other hooked end 72 engaging a lug 63 on drum 20, whereby lever 30 will at all times be urged to swing radially outward and so cause the cam pin 32 to always ride on the outer edge of cam slot 15 (see Fig. 4). Obviously spring 70 will also cause pin 35 to always ride on the left edge of slot 34 and so prevent any free or lost motion at this point.

While the form of embodiment of the present invention as herein disclosed, constitutes a preferred form, it is to be understood that other forms might be adopted, all coming within the scope of the claims which follow.

What is claimed is as follows:

1. In a tuning system utilizing a variable condenser having a rotatable shaft, in combination, a crank fixed to said shaft, a position indicating dial disk rotatably mounted upon said shaft, a swinging lever mounted upon said disk and engaging said crank whereby to cause rotation of said crank relative to said disk, and a stationary cam engaging said lever whereby to cause a swinging motion of said lever relative to said disk when said disk is rotated.

2. In a tuning system utilizing a variable condenser having a rotatable shaft, in combination, a crank fixed to said shaft, a shaft position indicating means loosely rotatably mounted upon said shaft, a swinging lever pivotally mounted upon said means and drivingly engaging said crank so as to cause rotation of said crank relative to said means, and a stationary cam engaging said lever to cause it to swing about its pivot on said means when said means rotates upon said shaft, whereby said indicating means and shaft will rotate together but at varying relative angular speeds.

3. In a tuning system utilizing a variable condenser having a rotatable shaft, in combination, a crank fixed to said shaft, a shaft position indicating means loosely rotatably mounted upon said shaft, a swinging lever pivotally mounted upon said means and drivingly engaging said crank through a pin and slot engagement whereby said shaft is rotated by the swinging movement of said lever, and a stationary cam engaging said lever to cause it to swing when said indicating means rotates upon said shaft, whereby said indicating means and shaft will rotate at varying relative angular speeds.

4. In a tuning system utilizing a variable condenser having a rotatable shaft, in combination, a crank fixed to said shaft, a shaft position indicating means loosely rotatably mounted upon said shaft, a swinging lever pivotally mounted upon said means and drivingly engaging said crank and a stationary cam engaging said lever to cause it to swing when said means rotates upon said shaft, whereby the relative angular speeds of said shaft and indicating means will vary.

5. In a tuning system utilizing a variable condenser having a rotatable shaft member, a member rotatably mounted upon said shaft member, a crank fixed to one of said members, a link operatively associated at one end thereof with the other of said members and at its other end with said crank, a cam follower supported by said link intermediate its ends and a cam surface adapted to be engaged by said cam follower whereby said members will rotate together but at varying relative angular speeds.

In testimony whereof I hereto affix my signature.

HERBERT L. BRUMP.